Jan. 13, 1959 M. A. ROBBINS, JR 2,868,472
FILM SPOOL HOLDING DEVICE FOR CAMERAS
Filed Aug. 19, 1954

INVENTOR
MAURICE A. ROBBINS, JR.
BY
ATTORNEYS

United States Patent Office 2,868,472
Patented Jan. 13, 1959

2,868,472

FILM SPOOL HOLDING DEVICE FOR CAMERAS

Maurice A. Robbins, Jr., Endwell, N. Y., assignor to General Aniline & Film Corporation, New York, N. Y., a corporation of Delaware Application August 19, 1954, Serial No. 451,028

3 Claims. (Cl. 242—71)

The present invention relates to cameras of the roll film type and is more particularly directed to a novel film spool supporting device.

In the usual roll film camera, the take-up spool for the film is associated with the film winding key and in order to remove the loaded spool or insert the empty spool, it is necessary to retract the stem of the film winding key. The removal of the loaded spool requires delicate handling and often results in dropping the loaded spool with its attendant disadvantages.

A primary object of the present invention is to provide a novel support for the take-up spool which also assists in the easy removal of the loaded film spool without requiring retraction of the winding key.

A further object of the invention is the provision of a mechanism of the type described above which is simple in structure, easy to operate and highly effective in use.

Other objects and advantages of the invention will be readily apparent from the following detailed description taken in connection with the accompanying drawing, wherein.

Figure 1:
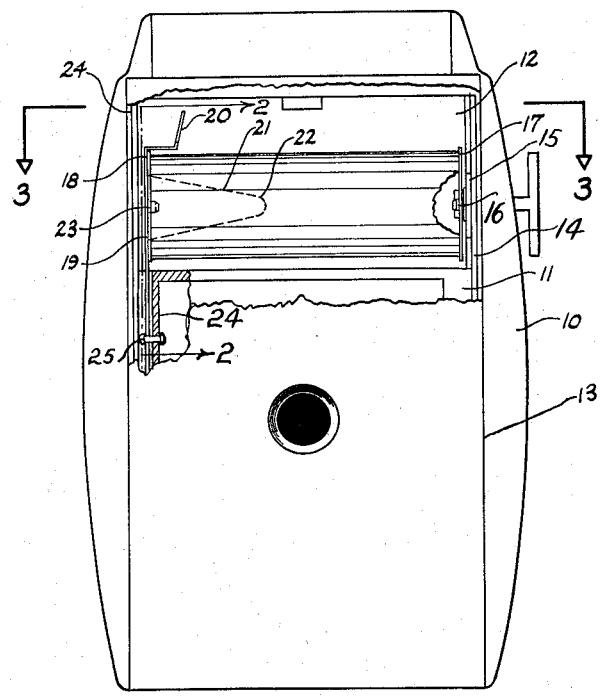
Fig. 1 is an elevational view of the rear of a camera with a portion of the cover removed to show the take-up spool and the novel spool support forming the subject matter of the present invention.

Referring to the drawing in detail, the camera, indicated by numeral 10, may be of conventional design and includes the usual exposure frame 11 over which the film is drawn for exposure, a film take-up chamber 12 at the upper end thereof and a similar shaped film supply chamber at the lower end of the exposure chamber, not shown. The camera also includes a back cover 13 which may have a viewing window, as shown, through which the number affixed to the conventional paper backing of the film used may be viewed. This cover is hingedly attached to the body of the camera whereby the cover may be swung to and from a position in which the supply film spool chamber and the exposure frame are exposed for loading.

Figures 3, 4:
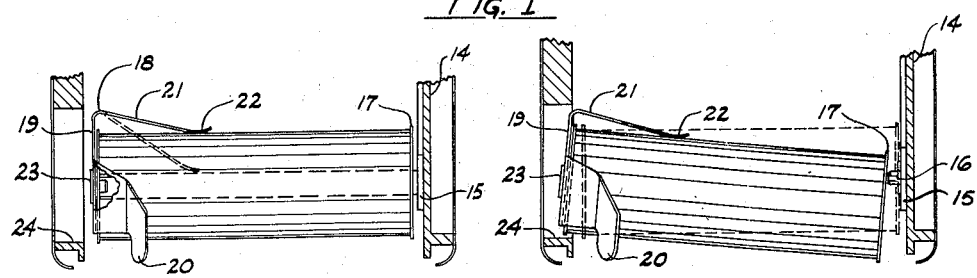
Fig. 3 is a sectional view taken on line 3—3 of Fig. 1 showing the position of the ejecting tab.
Fig. 4 is a similar view showing the loaded film spool partially ejected.
Figure 2:
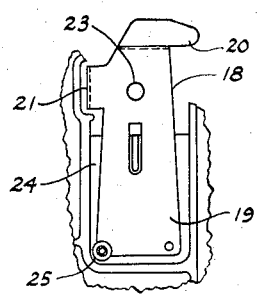
Fig. 2 is a fragmentary view of a part of the camera body taken on line 2—2 of Fig. 1 and showing the manner of mounting the film spool support in the camera.

The conventional film spool is provided at both ends with key slots, one of which cooperates with the usual winding key mechanism for rotating the spool and thus winding up the film. As seen in Figs. 1 and 4, the side wall 14 supports the winding key mechanism having a shaft 15, and having a key portion 16 cooperating with a key slot portion formed in the film spool 17. The opposite end of the film spool is supported by the novel film spool supporting device generally indicated by the numeral 18. The supporting device is formed of flexible spring-like metal and consists of a flat body portion 19 of generally rectangular shape having an integrally formed finger tab 20 extending inwardly from the top thereof. Adjacent the finger tab and extending inwardly from a rear edge of the body portion is a spring tension member 21 terminating in a curved tip 22. A film spool stud 23 is riveted centrally of the body portion 19 adjacent the spring tension member 21.

The film spool supporting device 18 is secured to the side wall 24 by means of a rivet 25 positioned at a lower corner of the body portion adjacent the edge from which the spring tension portion extends. The side wall 24 is suitably recessed adjacent the upper portion of the device 18 to permit the finger tab 20, the spring tension member 21 and the film spool stud 23 to extend into the film spool take-up chamber 12.

In the normal operation of the camera, the empty spool 17 is supported by the key shaft 16 and the stud 23. Since the film spool supporting device is formed of springy metal, the empty spool is easily inserted into wind-up position and is firmly held against the key shaft 16. When the empty spool is first inserted, the tip 22 of the spring tension member is spaced from the web of the spool. As film is wound on the spool, the tip 22 bears against the paper-backed film and thus the spring member 21 becomes progressively tensioned. To remove the loaded spool, outward pressure need only be applied against the finger tab 20 causing withdrawal of the spool from the key shaft 16. Due to the offset mounting of the film spool supporting device 18, outward movement thereof will cause a slight tilting of the body portion 19, and the spring tension member 21 tends to eject the loaded film spool outwardly, thereby assisting in the easy removal thereof from the camera.

While one embodiment of the invention has been disclosed, it is to be understood that the inventive concept may be carried out in a number of ways. This application is, therefore, not to be limited to the precise details disclosed, but is intended to cover all variations and modifications thereof falling within the spirit of the invention and the scope of the following claims.

I claim:

1. In a camera of the roll film type having a film take-up chamber defined between the side walls of the camera and a winding key rotatably mounted on one of the side walls, said winding key having a shaft portion for supporting one end of a film spool, a film spool holding device for supporting the other end of the film spool, a spring tension member connected to an edge of one end of said film spool holding device and extending inwardly from said edge and adapted to bear against a loaded film spool, and means for tiltably mounting said film spool holding device on the other of said side walls, said means being located adjacent said edge at the other end of said holding device whereby outward pressure applied to the corner of said holding device diagonally opposite from said mounting means will cause outward movement and tilting of the holding device so that the tilting of said holding device will force said spring member to bear against the loaded film spool with even greater pressure than provided by the spring tension of said spring member to enable ready release of the film spool.

2. A camera of the roll film type as defined in claim 1 which further comprises a finger tab extending inwardly toward said one side wall from the upper edge of said film spool holding device into the film take-up chamber and adapted to be pressed outwardly to cause outward movement of holding device.

3. A camera of the roll film type as defined in claim 2 wherein said film spool holding device, finger tab, and spring tension member are integrally formed of spring metal.

References Cited in the file of this patent

UNITED STATES PATENTS

| | | |
|---|---|---|
| 1,507,118 | Kabelitz | Sept. 2, 1924 |
| 2,537,883 | Ernisse | Jan. 9, 1951 |